(12) United States Patent
Ezawa et al.

(10) Patent No.: US 9,201,209 B2
(45) Date of Patent: Dec. 1, 2015

(54) IMAGE PICKUP DEVICE

(75) Inventors: Kozo Ezawa, Osaka (JP); Takeshi Shimamoto, Osaka (JP); Teruyuki Takizawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 203 days.

(21) Appl. No.: 14/115,464

(22) PCT Filed: Jun. 14, 2012

(86) PCT No.: PCT/JP2012/003885
§ 371 (c)(1),
(2), (4) Date: Nov. 4, 2013

(87) PCT Pub. No.: WO2012/172802
PCT Pub. Date: Dec. 20, 2012

(65) Prior Publication Data
US 2014/0091204 A1 Apr. 3, 2014

(30) Foreign Application Priority Data
Jun. 16, 2011 (JP) ................................ 2011-134253

(51) Int. Cl.
*G02B 7/04* (2006.01)
*G02B 7/08* (2006.01)
(Continued)

(52) U.S. Cl.
CPC .. *G02B 7/04* (2013.01); *G02B 7/08* (2013.01); *G02B 27/646* (2013.01); *G03B 3/10* (2013.01);
(Continued)

(58) Field of Classification Search
CPC .......... G02B 27/646; G02B 7/04; G02B 7/08; G03B 2205/0015; G03B 2205/0069; G03B 2205/0092; G03B 3/10; G03B 5/00; H04N 5/2253; H04N 5/2254; H04N 5/335
See application file for complete search history.

(56) References Cited

U.S. PATENT DOCUMENTS 5,128,806 A 7/1992 Ohno
2008/0278833 A1* 11/2008 Yuan ............................ 359/820
(Continued)

FOREIGN PATENT DOCUMENTS

CN 101713859 A 5/2010
JP 03-205635 A 9/1991
(Continued)

OTHER PUBLICATIONS

International Search Report for corresponding International Application No. PCT/JP2012/003885 mailed Aug. 28, 2012.
(Continued)

*Primary Examiner* — Francis M Legasse, Jr.
(74) *Attorney, Agent, or Firm* — Renner, Otto, Boisselle & Sklar, LLP

(57) ABSTRACT

An imaging device includes: a movable lens unit including at least one lens for converging light from a subject and a lens holder supporting the at least one lens; a body base supporting the movable lens unit so as to be capable of moving along a first direction and a second direction which are orthogonal to each other on a plane perpendicular to an optical axis of the at least one lens and along a third direction which is parallel to the optical axis of the at least one lens; an imager being supported by the body base for converting light transmitted through the movable lens unit to an electrical signal; a driving mechanism being provided on the movable unit and/or body base for driving the movable lens unit along the first, second, and third directions; and a plurality of strain detectors provided between the movable unit and the body base.

16 Claims, 13 Drawing Sheets

(51) Int. Cl.
  *G03B 3/10* (2006.01)
  *G03B 5/00* (2006.01)
  *G02B 27/64* (2006.01)
  *H04N 5/225* (2006.01)
  *H04N 5/335* (2011.01)

(52) U.S. Cl.
  CPC ............... *G03B 5/00* (2013.01); *H04N 5/2253* (2013.01); *H04N 5/2254* (2013.01); *H04N 5/335* (2013.01); *G03B 2205/0015* (2013.01); *G03B 2205/0069* (2013.01); *G03B 2205/0092* (2013.01)

(56) References Cited

U.S. PATENT DOCUMENTS

| | | | |
|---|---|---|---|
| 2010/0060777 | A1 | 3/2010 | Yumiki |
| 2010/0079604 | A1 | 4/2010 | Washisu |
| 2010/0165132 | A1 | 7/2010 | Tokiwa et al. |
| 2012/0154614 | A1 | 6/2012 | Moriya et al. |

FOREIGN PATENT DOCUMENTS

| | | | |
|---|---|---|---|
| JP | 04-219709 | A | 8/1992 |
| JP | 08-068899 | A | 3/1996 |
| JP | 11-118414 | A | 4/1999 |
| JP | 11-344740 | A | 12/1999 |
| JP | 2005-217928 | A | 8/2005 |
| JP | 2006-339500 | A | 12/2006 |
| JP | 2007-114061 | A | 5/2007 |
| JP | 2009-109888 | A | 5/2009 |
| JP | 2010-092030 | A | 4/2010 |
| JP | 2010-152037 | A | 7/2010 |
| JP | 2011-065140 | A | 3/2011 |

OTHER PUBLICATIONS

Forms PCT/IPEA/416 and PCT/IPEA/409 for corresponding International Application No. PCT/JP2012/003885 dated Oct. 29, 2013.
Chinese Search Report (with English translation) for corresponding Chinese Application No. 201280023529.4 dated Aug. 25, 2015.

* cited by examiner (a)　　　　　　　　　(b)

IMAGE PICKUP DEVICE

TECHNICAL FIELD

The present application relates to an imaging device which drives a group of lenses in an optical system in directions along three or more axes with a single actuator, thus enabling adjustment of optical characteristics or enhancement of optical performance.

BACKGROUND ART

In recent years, digital still cameras are rapidly gaining prevalence. Digital still cameras are required to become smaller in size and lower in price, and also to have a high performance. Therefore, recent digital still cameras are equipped with performance-enhancing mechanisms, e.g., a zoom mechanism, an autofocus mechanism, and an optical handshake correction mechanism. However, a camera equipped with these will become large-sized, and cost a lot in production; thus, methods for solving this dilemma are being needed.

FIG. 14 shows lens optics 100 of a commonly-used digital still camera disclosed in Patent Document 1. As shown in FIG. 14, the lens optics 100 are zoom optics, and include a zoom mechanism, a focus adjustment mechanism, and an iris on which an optical handshake correction mechanism, a stop for exposure adjustment, and the like are provided.

The lens optics 100 include a barrel body 101. First, fixed lenses attached to the barrel body 101 will be described. On the barrel body 101, a central fixed lens unit 110 and an imaging-side fixed lens unit 130 are provided. The central fixed lens unit 110 includes a central fixed lens 113, which is fixed to the barrel body 101 by being retained in a central fixed lens holder 111. The imaging-side fixed lens unit 130 includes an imaging-side fixed lens 133 which is fitted into the barrel body 101 while being retained in an imaging-side fixed lens holder 131 and which is fixed by an imaging-side fixed lens retainer 135.

Next, the zoom mechanism will be described. The zoom mechanism includes a zoom main-axis 105M and a zoom sub-axis 105S which are provided on the barrel body 101 and provide guidance when the lens units move. It also includes a first zoom lens unit 150 and a second zoom lens unit 170. The first zoom lens unit 150 includes a first zoom lens 153 and a first zoom lens holder 151 retaining the first zoom lens 153. Similarly, the second zoom lens unit 170 includes a second zoom lens 173 and a second zoom lens holder 171 retaining the second zoom lens 173. A first zoom main-axis receiver 152M and a first zoom sub-axis receiver 152S of the first zoom lens holder 151 are supported on the zoom main-axis 105M and the zoom sub-axis 105S so as to be capable of moving, whereby the first zoom lens 153 moves along the optical axis (indicated by a shown dot-dash line) direction. Similarly, a second zoom main-axis receiver 172M and a second zoom sub-axis receiver 172S of the second zoom lens holder 171 are supported on the zoom main-axis 105M and the zoom sub-axis 105S so as to be capable of moving, whereby the second zoom lens 173 moves along the optical axis direction.

Next, the focus adjustment mechanism will be described. The focus adjustment mechanism includes a focus adjustment unit 140 and a focus lens unit 180. The focus adjustment unit 140 includes: a focus adjustment unit main-frame 142M and a focus adjustment unit sub-frame 142S; a focus adjustment unit main-axis receiver 143M and a focus adjustment unit sub-axis receiver 143S which are provided thereon; a focus motor 141; and a focus adjustment lens driving screw 145G. The focus adjustment unit main-axis receiver 143M and the focus adjustment unit sub-axis receiver 143S are supported on the zoom main-axis 105M and the zoom sub-axis 105S, respectively. As the focus motor 141 rotates the focus adjustment lens driving screw 145G in the direction of an arrow DC, the focus adjustment unit main-frame 142M and the focus adjustment unit sub-frame 142S move along the optical axis direction.

The focus lens unit 180 includes a focus adjustment lens holder 181 and a focus adjustment lens 183 which is supported by the focus adjustment lens holder 181. On the focus adjustment lens holder 181, a focus adjustment lens nut 182N and a focus adjustment lens sub-axis receiver 182S are provided. The focus adjustment lens nut 182N is supported so as to be capable of moving along the axial direction while being engaged in a helical groove which is provided in the focus adjustment lens driving screw 145G, and the focus adjustment lens sub-axis receiver 182S is supported by a focus adjustment lens guide 145S which is provided on the focus adjustment unit sub-frame 142S.

A stepping motor being used as the focus motor 141, the focus adjustment mechanism may first detect a terminal position, in a flush state against either moving end, by detecting e.g. an electric current value which increases at that position, and count the number of steps to any moved position therefrom, thus being able to detect a position of the focus adjustment lens 183 along the optical axis direction. Alternatively, this can be detected by an MR device, a hole device, or the like.

Next, the optical handshake correction mechanism will be described. The optical handshake correction mechanism includes an optical handshake correction lens unit 190. The optical handshake correction lens unit 190 includes an optical handshake correction lens holder 191 and an optical handshake correction lens 193 which is retained in the optical handshake correction lens holder 191. The optical handshake correction lens holder 191 is supported so as to be capable of moving relative to the barrel body 101 along an arrow DS1 direction and an arrow DS2 direction (a direction which is orthogonal to the arrow DS1 direction and the optical axis, i.e., a direction which is orthogonal to the plane of the figure), and is driven in the respective directions by a correction first actuator 195a and a correction second actuator 195b. Moreover, the correction first actuator 195a and the correction second actuator 195b are supported respectively on the zoom main-axis 105M and the zoom sub-axis 105S via an optical handshake correction main-axis receiver 192M and an optical handshake correction sub-axis receiver 192S, and thus are capable of moving along the optical axis direction of the lenses.

The amount by which the optical handshake correction mechanism moves the optical handshake correction lens unit 190 is small. Therefore, a hole device can be used for the position detection along the two axes.

For the correction first actuator 195a and the correction second actuator 195b, techniques which are already widely prevalent are used, e.g., a driving force from voice coil-type translatory actuators, or a driving force which is obtained by converting rotary force from a stepping motor into translation by way of screw feeding.

The zoom mechanism includes driving mechanisms and position detecting mechanisms, not shown, for driving the respective lens units along the optical axis direction. The method of driving can be implemented with a construction of realizing predetermined control for actuation by motor-driving an integral cam member which has a cam groove for supporting and guiding each lens holder, a construction of realizing predetermined control for actuation with a motor acting on a screw feed mechanism that is provided for each, or the like.

As the means for detecting the position of any such lens unit along the optical axis direction, an encoder for detecting the movement of a cam member, an MR device, a hole device, or the like can be used.

Because of having a zoom mechanism and a focus adjustment mechanism for moving the lenses along the optical axis direction, and an optical handshake correction mechanism for moving the lenses along biaxial directions which are orthogonal to the optical axis and which are orthogonal to each other, the lens optics 100 having such a construction requires four kinds of driving mechanisms along triaxial directions at the most. Therefore, such a construction makes downsizing and cost reduction of the entire device difficult.

CITATION LIST

Patent Literature

[Patent Document 1] Japanese Laid-Open Patent Publication No. 2010-92030

SUMMARY OF INVENTION

Technical Problem

Because of having a zoom mechanism and a focus adjustment mechanism for moving the lenses along the optical axis direction, and an optical handshake correction mechanism for moving the lenses along biaxial directions which are orthogonal to the optical axis and which are orthogonal to each other, the lens optics 100 with the construction disclosed in Patent Document 1 requires four kinds of driving mechanisms along triaxial directions at the most. Therefore, such a construction makes downsizing and cost reduction of the entire device difficult.

One non-limiting and exemplary embodiment provides an imaging device having a small driving mechanism.

Solution to Problem

An imaging device according to an embodiment of the present invention comprises: a movable lens unit including at least one lens for converging light from a subject and a lens holder supporting the at least one lens; a body base supporting the movable lens unit so as to be capable of moving along a first direction and a second direction which are orthogonal to each other on a plane perpendicular to an optical axis of the at least one lens and along a third direction which is parallel to the optical axis of the at least one lens; an imager being supported by the body base for converting light transmitted through the movable lens unit to an electrical signal; a driving mechanism being provided on the movable unit and/or the body base for driving the movable lens unit along the first, second, and third directions; and a plurality of strain detectors provided between the movable unit and the body base.

Advantageous Effects of Invention

With the imaging device disclosed herein, because a driving mechanism for moving a movable lens unit along triaxial directions is provided, it is possible to realize focus adjustment and optical handshake correction with a single driving mechanism, thus making it possible to downsize the imaging device. Moreover, by using strain detectors for detecting the position of the movable lens unit, it is possible to inexpensively detect the position of the movable lens unit with a simple construction, thus realizing focus adjustment and optical handshake correction.

DESCRIPTION OF EMBODIMENTS

Figure 1:
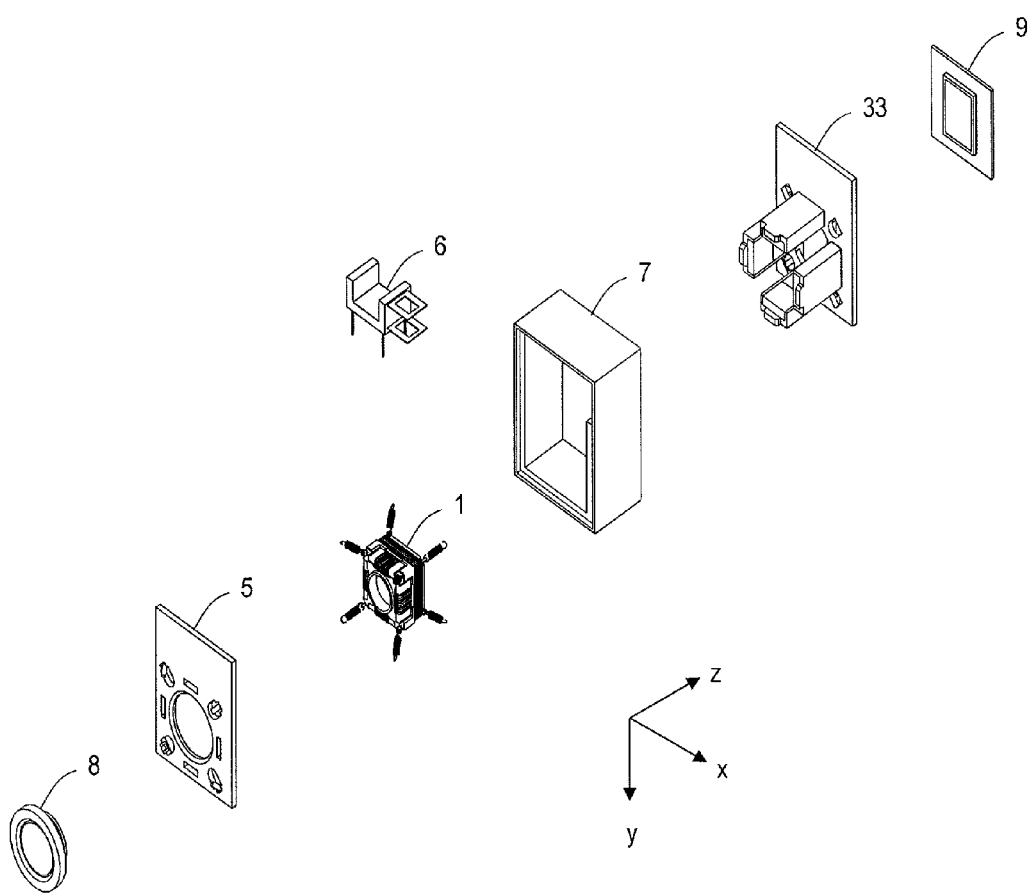
FIG. 1 is an exploded perspective view showing an embodiment of an imaging device according to the present invention.

Embodiments of the present invention can be summarized as follows.

An imaging device according to an embodiment of the present invention comprises: a movable lens unit including at least one lens for converging light from a subject and a lens holder supporting the at least one lens; a body base supporting the movable lens unit so as to be capable of moving along a first direction and a second direction which are orthogonal to each other on a plane perpendicular to an optical axis of the at least one lens and along a third direction which is parallel to the optical axis of the at least one lens; an imager being supported by the body base for converting light transmitted through the movable lens unit to an electrical signal; a driving mechanism being provided on the movable unit and/or the body base for driving the movable lens unit along the first, second, and third directions; and a plurality of strain detectors provided between the movable unit and the body base.

With the imaging device disclosed herein, the movable lens unit can be moved independently along orthogonal triaxial directions by the driving mechanism. Moreover, the position of the movable lens unit relative to the body base can be detected with the strain detectors. This doubles as a driving mechanism for focus adjustment and a driving mechanism for optical handshake correction, whereby the space needed for the driving mechanism can be reduced. Moreover, feedback control of the position of the movable lens unit is possible.

Each of the plurality of strain detectors has a supporter made of an elastic and a strain detection section made of an electrical conductor disposed on the supporter.

The strain detection section has a meandering pattern on a surface of the supporter.

The imaging device further comprises an elastic member provided at one end of each of the plurality of strain detectors, each strain detector and the corresponding elastic member being connected in series and provided between the movable unit and the body base.

Each of the plurality of strain detectors is made of an electrical conductor, and includes a coil-shaped strain detection section. As a result, even if the amount of displacement of the movable lens unit is increased, position detection by the strain detectors is possible without hindrance. Moreover, it is possible to accurately detect a displacement occurring only along directions of expansion or contraction of coiled springs.

The imaging device further comprises an elastic member provided at one end of each of the plurality of strain detectors, wherein, each strain detector includes a strain detection section made of an electrical conductor; and each strain detector and the corresponding elastic member are connected in series and provided between the movable unit and the body base.

The imaging device comprises at least four said strain detectors.

The imaging device comprises eight said strain detectors.

The plurality of strain detectors have identical electrical characteristics to one another. As a result, amount-of-strain calculation can be simplified, thereby reducing the calculation time. Moreover, part procurement at the time of mass production or the like is facilitated, an improved design balance is obtained, and cost reduction and quality stability can be ensured.

The electrical conductor includes at least one selected from the group consisting of platinum, iron, nickel, chromium, tungsten, aluminum, gold, copper, and silver. Since these materials are easy to obtain, quality stability or procurement stability can be ensured, for example, and cost reduction becomes possible.

The imaging device further comprises at least one lens supported by the body base. As a result, it becomes possible to provide enhanced freedom for optical performance improvements, e.g., suppression of various optical aberrations.

The imaging device further comprises a support unit provided between the body base and the movable lens unit so as to be capable of moving relative to the body base along a first direction and a second direction which are orthogonal to each other on a plane perpendicular to an optical axis of the at least one lens and along a third direction which is parallel to the optical axis of the at least one lens.

The support unit includes a support holder, four wires, and two plate springs; the lens holder is supported on the support holder via the four wires; and the support holder is supported on the body base via the two plate springs. As a result, linear motion can reliably occur in each direction. Moreover, linear motion along triaxial directions can be reliably achieved with a simple construction.

Moreover, it is possible to suppress movements other than those along the triaxial directions, and enhance the precision of position detection of the movable lens unit relative to the body base. As a result, a reliable position feedback control of the movable section becomes possible.

The driving mechanism includes: a first coil supported on the lens holder and wound around a direction parallel to the first direction; a second coil supported on the lens holder and wound around a direction parallel to the second direction; a third coil supported on the lens holder and wound around a direction parallel to the third direction; a first magnet supported on the body base and disposed so that respectively different magnetic poles oppose the first coil and the third coil; and a second magnet supported on the body base and disposed so that respectively different magnetic poles oppose the second coil and the third coil. As a result, it becomes possible to drive the movable lens unit rapidly and stably. Moreover, it becomes possible to drive the movable lens unit with a good centroidal balance with respect to the optical axis. As a result, a driving with excellent frequency characteristics, such that the optical performance is hardly deteriorated, can be realized.

The driving mechanism includes two of at least one of the first coil and the second coil, the two sandwiching the optical axis of the at least one lens in the lens holder.

The first coil and the second coil have identical electromagnetic characteristics. As a result, identical parts with identical specifications can be used for the first coil and the second coil, thus ensuring quality stability and procurement stability, and also realizing cost reduction.

Hereinafter, with reference to the drawings, an embodiment of the imaging device according to the present invention will be described.

Figure 2:
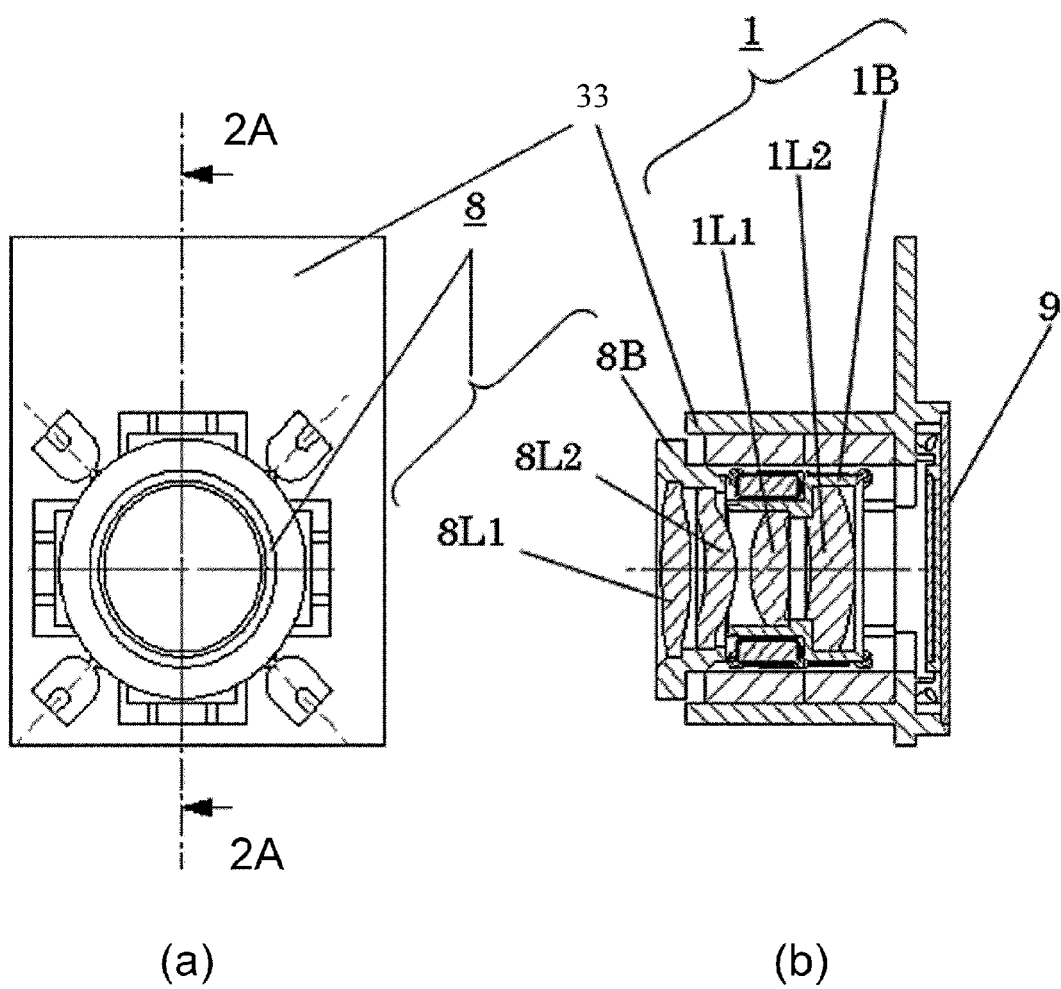
FIGS. 2(a) and 2(b) are an upper plan view and a cross-sectional view showing the schematic construction of the imaging device shown in FIG. 1.

FIG. 1 is an exploded perspective view showing how the entire imaging device is assembled. FIG. 2(*a*) is a diagram showing the imaging device as viewed from the subject side; and FIG. 2(*b*) is a cross-sectional view taken at center line 2A-2A of FIG. 2(*a*), where the upper left side in the figure is the subject side.

The imaging device shown in FIG. 1 includes: imaging optics including a movable lens unit 1 and a fixed lens unit 8; an imager 9; a support unit 6; a body base 7; and a driving mechanism.

As shown in FIG. 2(*b*), the movable lens unit 1 includes a movable lens holder 1B and at least one lens supported by the movable lens holder 1B. In the present embodiment, the movable lens unit 1 includes a movable first lens 1L1 and a movable second lens 1L2, which are supported by the movable lens holder 1B.

As shown in FIGS. 2(*a*) and (*b*), the fixed lens unit 8 includes a fixed lens holder 8B and at least one lens. In the present embodiment, the fixed lens unit 8 includes a fixed first lens 8L1 and a fixed second lens 8L2, which are supported by the fixed lens holder 8B.

The imager 9, which is fixed to the lower body base 33, detects light that is transmitted through the fixed lens unit 8 and the movable lens unit 1, and converts it to an electrical signal. The electrical signal which is generated by the imager 9 is converted into image data by using an image processing method that is employed in commonly-used digital still cameras. A CCD image sensor or a CMOS image sensor can be used for the imager 9.

The fixed lens holder 8B is fixed to the body base 7. On the other hand, as is described below, the movable lens unit 1 is supported by the body base, by way of the support unit 6, so as to be capable of moving along a first direction (x direction) and a second direction (y direction) which are orthogonal to each other on a plane which is perpendicular to the optical axis of the movable first lens 1L1 and the movable second lens 1L2 (i.e., the xy plane of the coordinate system shown in FIG. 1), and along a third direction (z direction) which is parallel to the optical axis. Therefore, as the movable lens unit 1 moves along the first, second, and third directions, light which is transmitted through the fixed lens unit 8 moves in the respectively directions on the imaging area of the imager 9. Thus, by moving the movable lens unit 1 alone along the third direction, it is possible to achieve focus adjustment for a subject image which is captured with the imager 9. Moreover, by moving the movable lens unit 1 along the first and second directions, it is possible to achieve optical handshake correction for a subject image which is captured by the imager 9.

Figure 3:
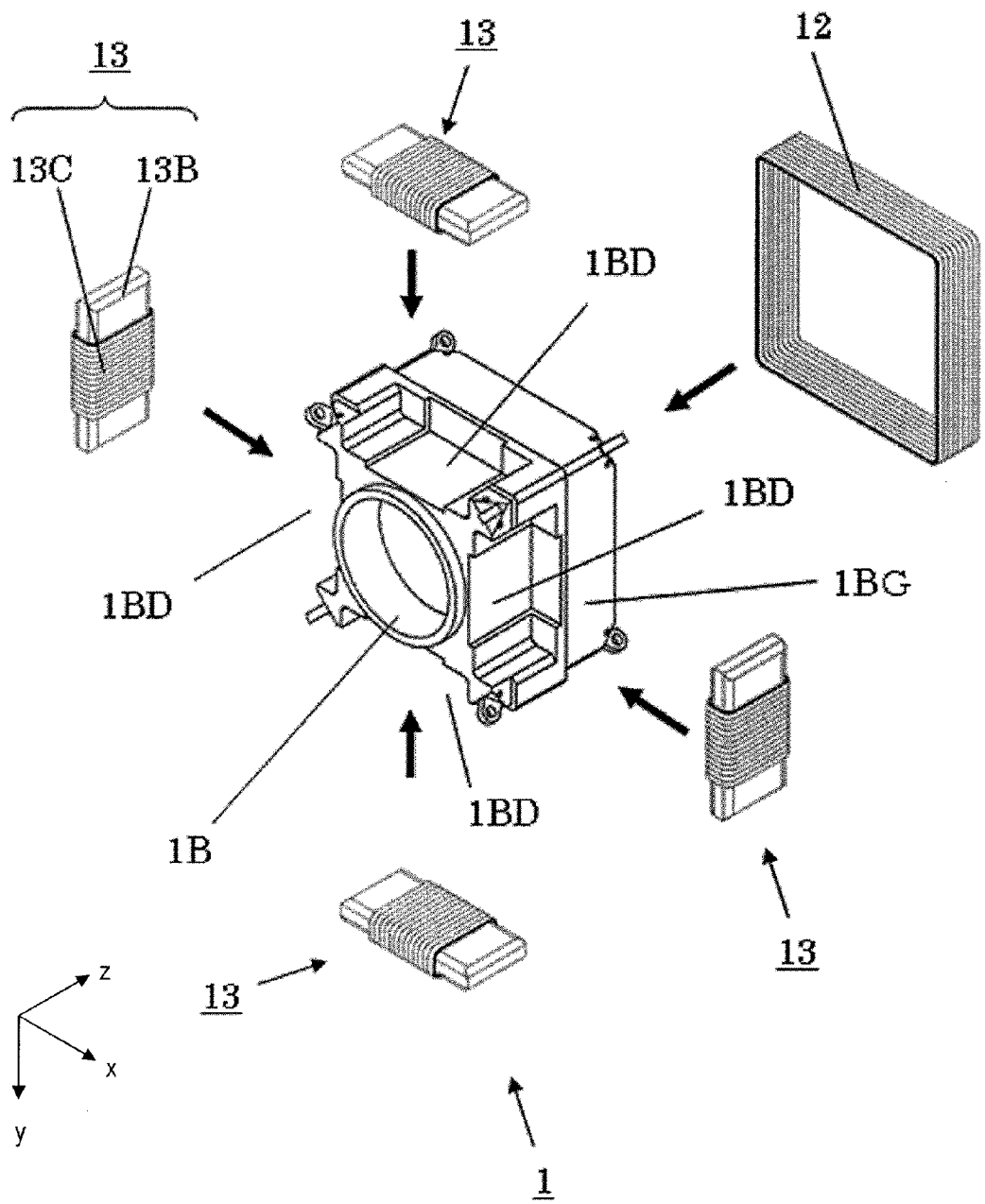
FIG. 3 is an exploded perspective view showing coils which are used for a movable lens unit of the imaging device shown in FIG. 1.

In order to move the movable lens unit 1 along the first, second, and third directions relative to the body base 7, the imaging device includes a driving mechanism. As shown in FIG. 3, the driving mechanism includes an optical axis direction driving coil (third coil) 12 and four orthogonal direction driving coils (first and second coils) 13C.

The optical axis direction driving coil 12 is wound around a direction that is parallel to the third direction (z axis), and fixed to a coil base portion 1BG of the movable lens holder 1B in the wound-around state. Each orthogonal direction driving coil 13C is wound around a coil bobbin 13B to constitute an orthogonal direction driving coil unit 13. Each orthogonal direction driving coil unit 13 is fixed to a coil bobbin receptacle 1BD of the movable lens holder 1B. As shown in FIG. 3, among the orthogonal direction driving coils 13C of the four orthogonal direction driving coil units 13, one pair of orthogonal direction driving coils (first coil) 13C are wound around a direction that is parallel to the first direction (x axis), whereas the other pair of orthogonal direction driving coils (second coil) 13C are wound around a direction that is parallel to the second direction (y axis). The fixation and retention of the optical axis direction driving coil 12 and the orthogonal direction driving coil units 13 onto the movable lens holder 1B is made via adhesively bonding or the like. Preferably, the one pair of orthogonal direction driving coils (first coil) are identical in electromagnetic characteristics to each other. Preferably, the other pair of orthogonal direction driving coils (second coil) 13C are also identical in electromagnetic characteristics to each other. It is preferable that the four orthogonal direction driving coils are identical in electromagnetic characteristics to one another, because it will facilitate control of the generated magnetism.

Figure 4:
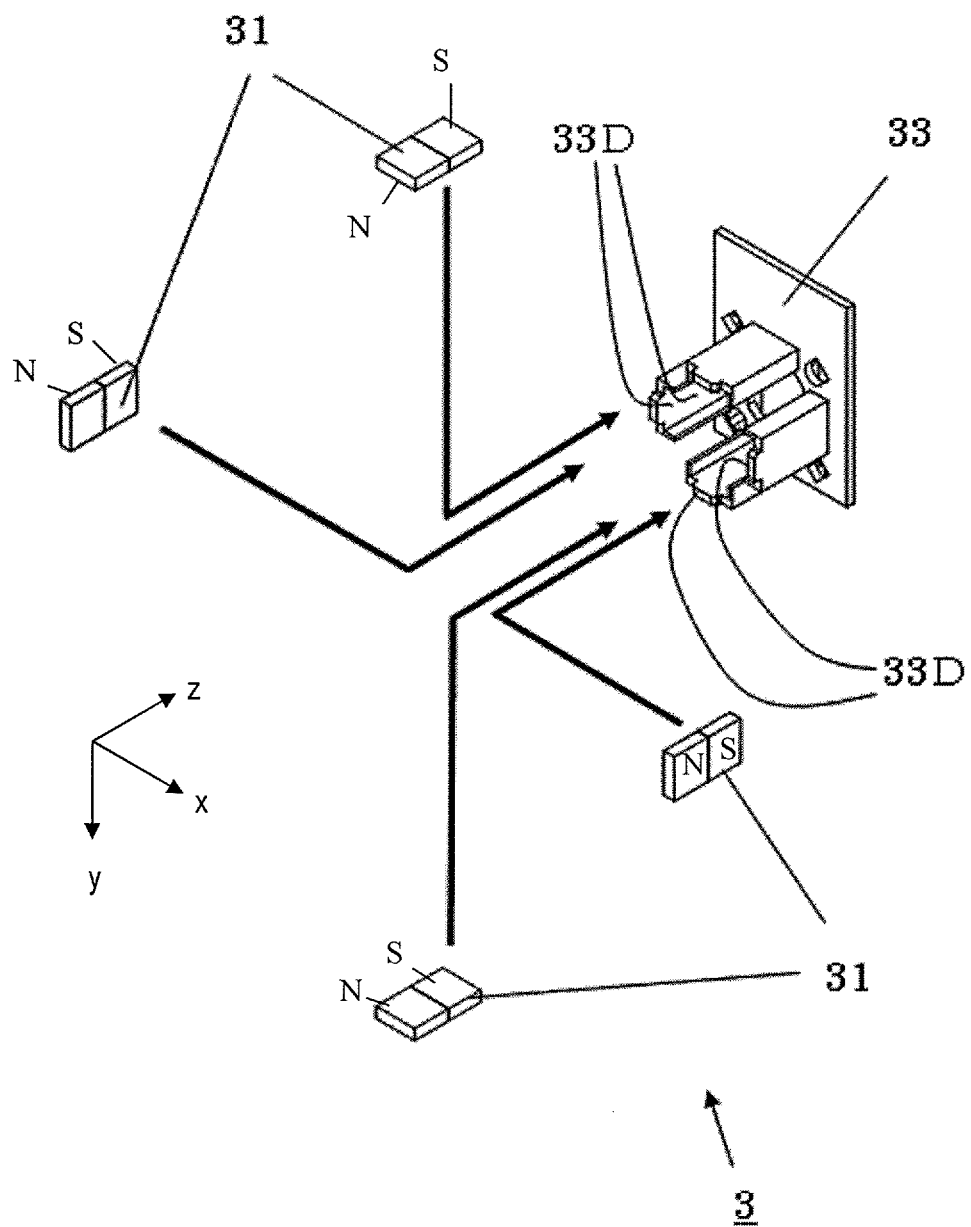
FIG. 4 is an exploded perspective view of magnet units which are provided on a body base of the imaging device shown in FIG. 1.

The driving mechanism further includes four magnets 31. As shown in FIG. 4, four magnet receptacles 33D are provided on the lower body base 33, such that the magnets 31 are fixed to the magnet receptacles 33D. By using a ferromagnetic steel material such as S45C for the lower body base 33, leakage of magnetic flux to the outside can be efficiently suppressed, and fixation of the magnets 31 to the lower body base 33 will be enhanced. A more stable performance can be obtained by adhesively bonding the magnets 31 to the lower body base 33. As shown in FIG. 4, the four magnets 31 are each placed with differing magnetic poles lying along the third direction (z direction).

Figure 5:
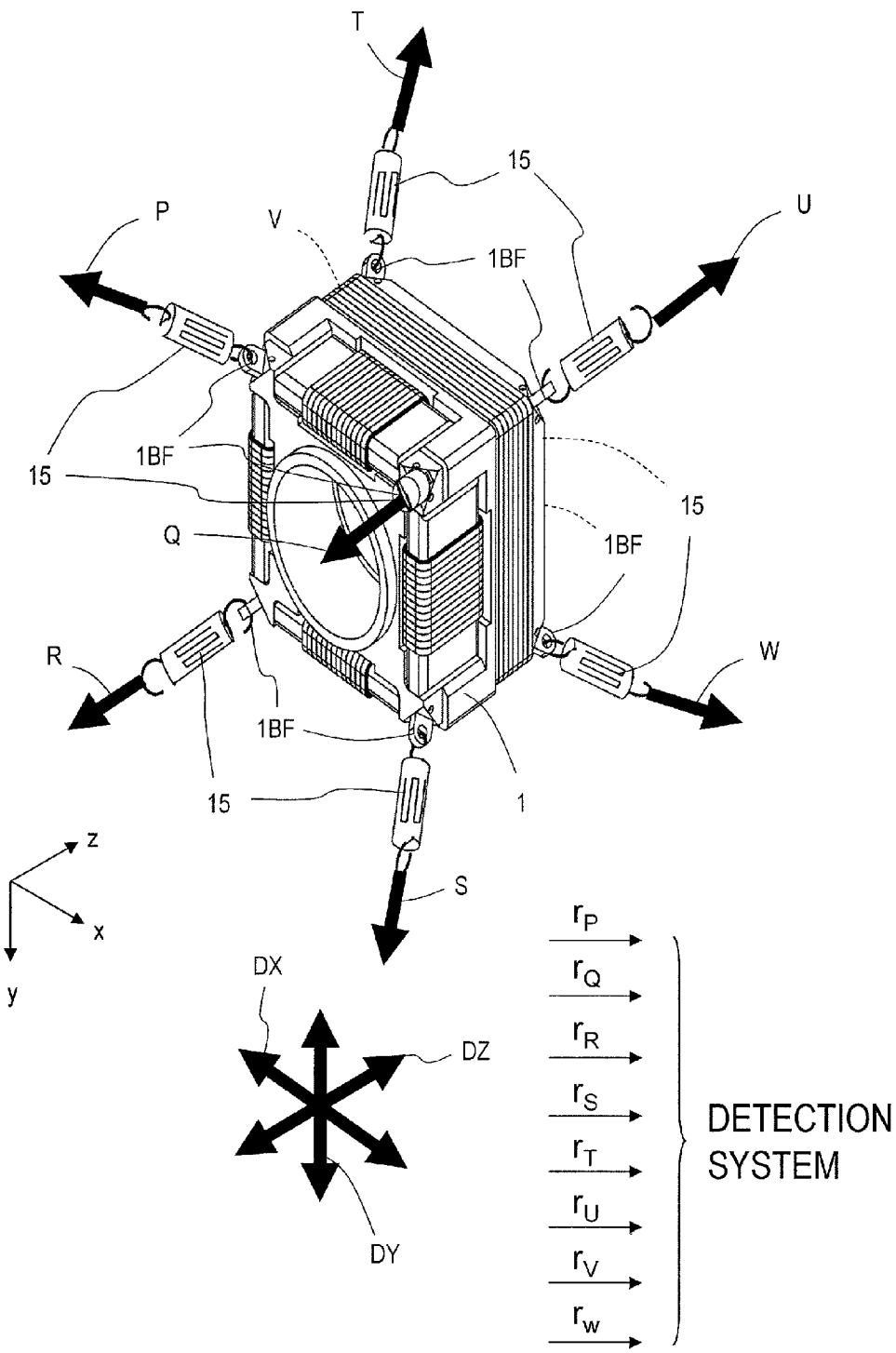
FIG. 5 is a perspective view showing the movable lens unit and strain detectors of the imaging device shown in FIG. 1.

As shown in FIG. 5, in order to detect amounts of displacement of the movable lens unit 1 relative to the body base 7, the imaging device of the present embodiment includes a plurality of strain detectors 15. In the present embodiment, eight strain detectors are provided. The strain detectors 15 are provided between the movable lens unit 1 and the body base 7.

Figure 6:
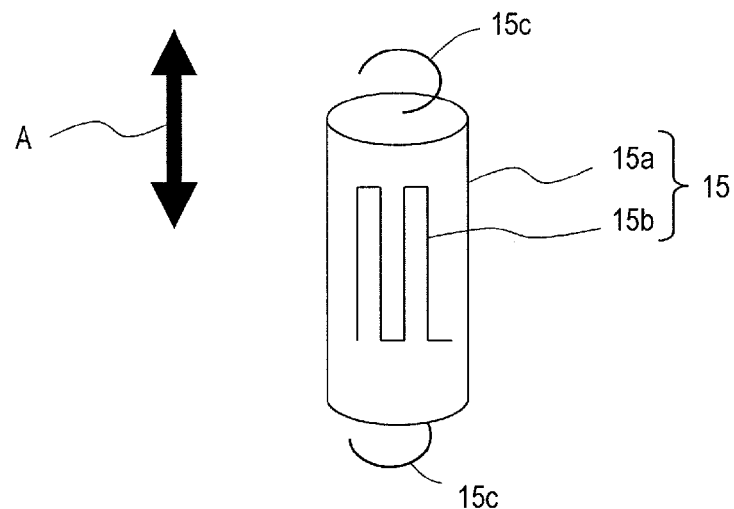
FIGS. 6(a) and 6(b) are perspective views showing other examples of strain detectors of the imaging device shown in FIG. 1.
Figure 6:
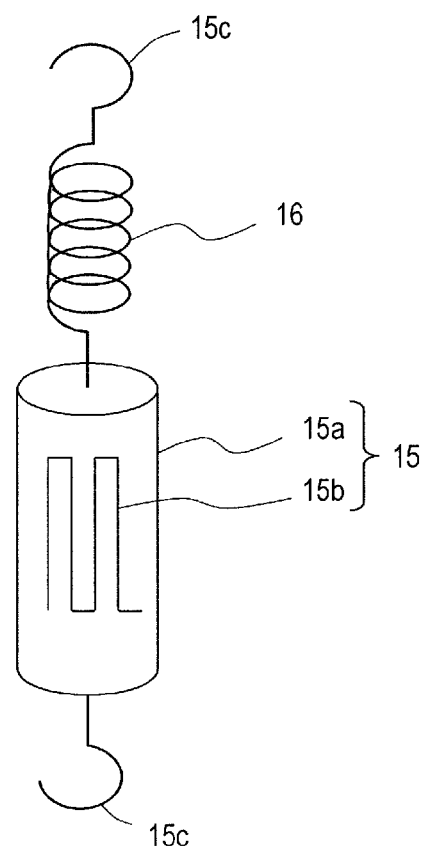

FIG. 6(a) schematically shows an exemplary structure of a strain detector 15. The strain detector 15 includes a supporter 15a and a strain detection section 15b which is disposed on the supporter 15a, for example.

The supporter 15a has a longitudinal direction A, and includes hooks 15c at both ends of the longitudinal direction. The supporter 15a is composed of an elastic so as to be capable of elastic deformation along the longitudinal direction A. The elastic material to compose the supporter 15a depends on how much the movable lens unit 1 may be displaced relative to the body base 7. In the case where the amount of displacement of the movable lens unit 1 is large, it is preferable that the supporter 15a is composed of an elastic having a small elastic modulus in order not to hinder displacement of the movable lens unit 1. However, when the amount of displacement of the movable lens unit 1 is large, or when the supporter 15a undergoes elastic deformation beyond the elastic deformation range of the detection section 15b due to the supporter 15a being composed of an elastic with a small elastic modulus, the detection section 15b may become broken, or the strain detection section 15b may be delaminated from the supporter 15a, thus making it impossible to correctly detect strain.

In this case, the structure shown in FIG. 6(b) may be adopted. Specifically, an elastic member 16 of a spring shape is connected at one end of the strain detector 15, and hooks 15c are provided at both ends of the series connection of the strain detector 15 and the elastic member 16. These structures may be provided between the movable lens unit 1 and the body base 7. With this structure, the elastic member 16 is able to undergo a large elastic deformation, and the stress occurring through elastic deformation is applied to the supporter 15a, whereby the strain detection section 15b can correctly detect strain between the two hooks 15c.

The strain detection section 15b has a linear pattern of electrical conductor which is disposed on the surface of the supporter 15a, as shown in FIG. 6(a). The electrical conductor contains at least one selected from the group consisting of platinum, iron, nickel, chromium, tungsten, aluminum, gold, copper, and silver, for example. In other words, the conductor may be any of these metals alone, or an alloy of two or more selected from among these metals. The linear pattern at least includes a portion extending along the longitudinal direction A. In the present embodiment, a plurality of portions extending along the longitudinal direction A are included, such that the strain detection section 15b presents a meandering pattern as a whole. Since the supporter 15a undergoes elastic deformation along the longitudinal direction A, the linear pattern of the strain detection section 15b also expands or contracts along the longitudinal direction A. As a result, the cross-sectional area perpendicular to the longitudinal direction A of the linear pattern increases or decreases, whereby a change occurs in the electrical resistance detected at both ends of the linear pattern. Thus, by detecting the change in electrical resistance between both ends of the strain detection section 15b of the strain detector 15, the stress applied to the strain detector 15, i.e., the supporter 15a, can be detected.

Preferably, the plurality of strain detectors 15 have identical electrical characteristics to one another so that, after stress detection, the position of the movable lens unit 1 is easily calculated through signal processing. For example, by adopting identical parts for the plurality of strain detectors 15, it can be ensured that they have matching electrical characteristics. As such strain detectors 15, devices for detecting strain which are commercially available as strain gauges can be used, for example.

As shown in FIG. 5, the movable lens holder 1B has a substantially octahedral shape, with lens holder hooks 1BF being provided at the respective corners of the octahedron.

Figure 7:
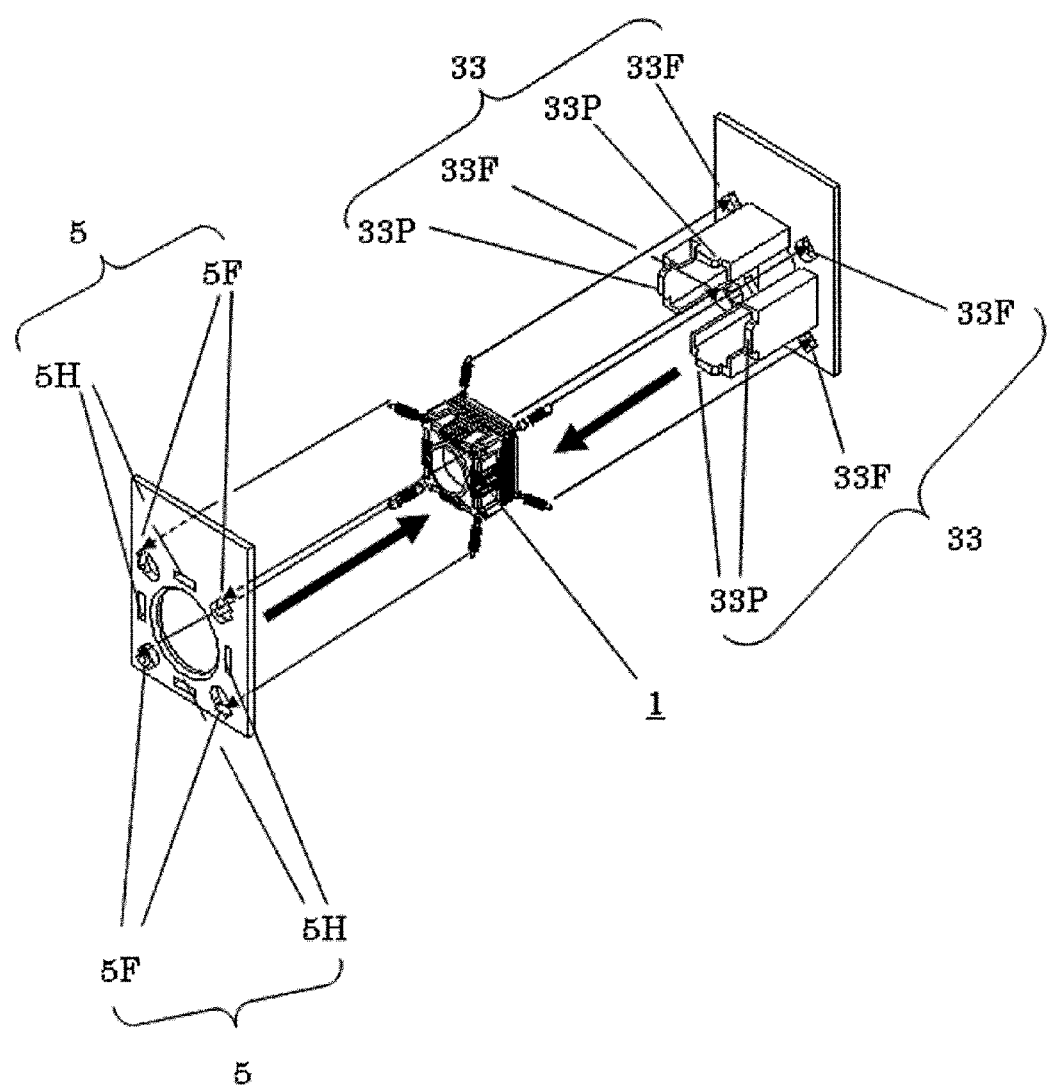
FIG. 7 is an exploded perspective view showing movable lens unit of the imaging device shown in FIG. 1 and its attachment to upper and lower body bases.

The hook 15c at one end of each of the eight strain detectors 15 is engaged on a lens holder hook 1BF. As shown in FIG. 7, the other hooks 15c of the eight strain detectors 15 are engaged on hooks 5F the upper body base 5 and hooks 33F of the lower body base 33. As a result of this, each strain detector 15 is placed between the movable lens unit 1 and the body base 7 with its movement being restricted along the longitudinal direction A but having freedom along other directions so as to enable rotation relative to the movable lens unit 1 and the body base 7. Connection between the strain detectors 15 and the movable lens unit 1 and body base is not limited to hooks so long as the aforementioned freedom is obtained; the strain detectors 15 may be connected to the movable lens unit 1 and the body base 7 via any other shapes or variants.

As alignment bumps 33P on the lower body base 33 are fitted into upper body base alignment holes 5H on the upper body base 5, alignment therebetween is achieved so that the upper body base 5 is coupled to the lower body base 33. Although not shown in FIG. 7 for ease of understanding, the upper body base 5 and the lower body base 33 are coupled with the body base 7 interposed therebetween; thus, the upper body base 5 and the lower body base 33 are each coupled also to the body base 7, as shown in FIG. 1.

Figure 8:
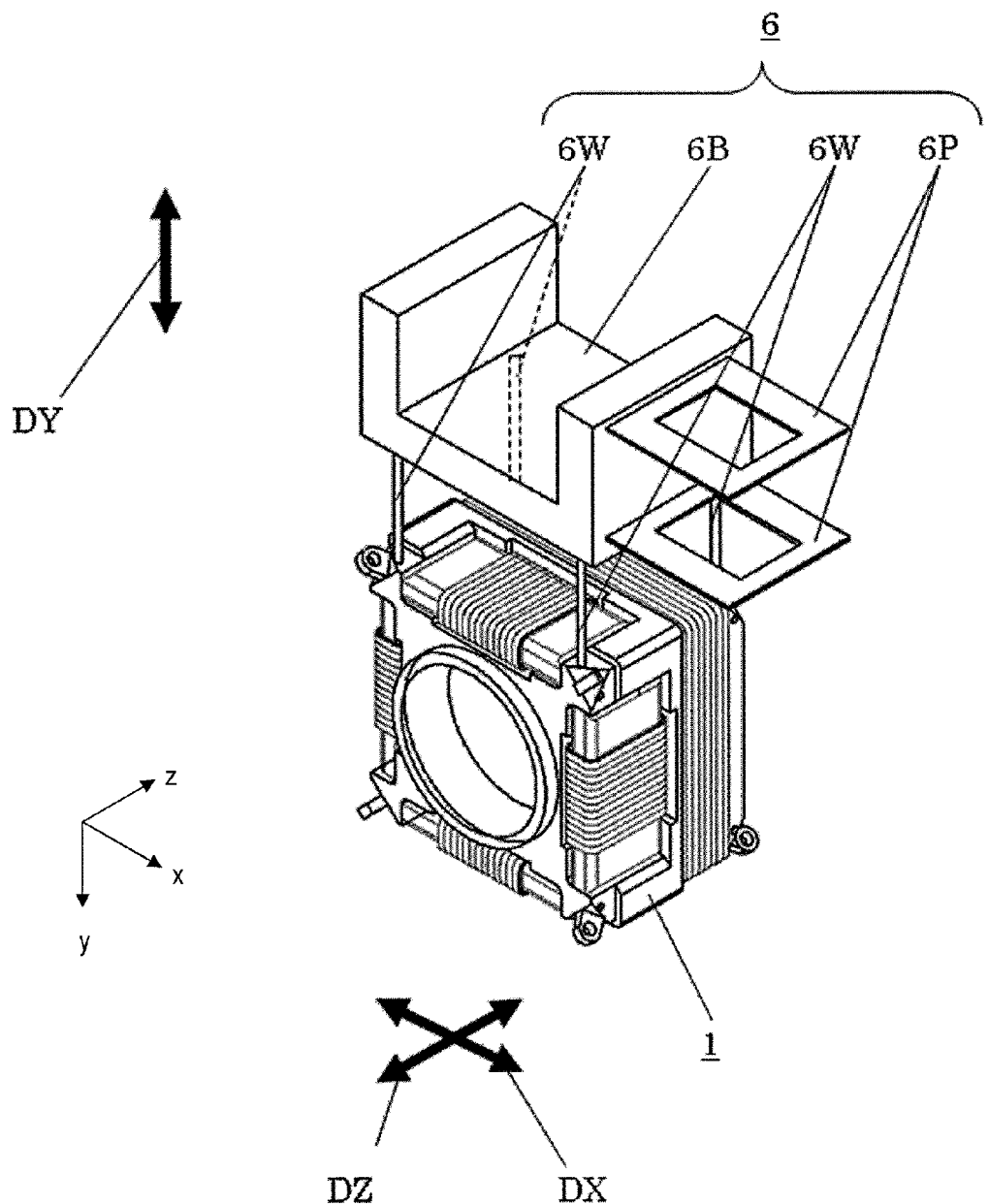
FIG. 8 is a perspective view showing the relationship between the movable lens unit and a support unit of the imaging device shown in FIG. 1.
Figure 9:
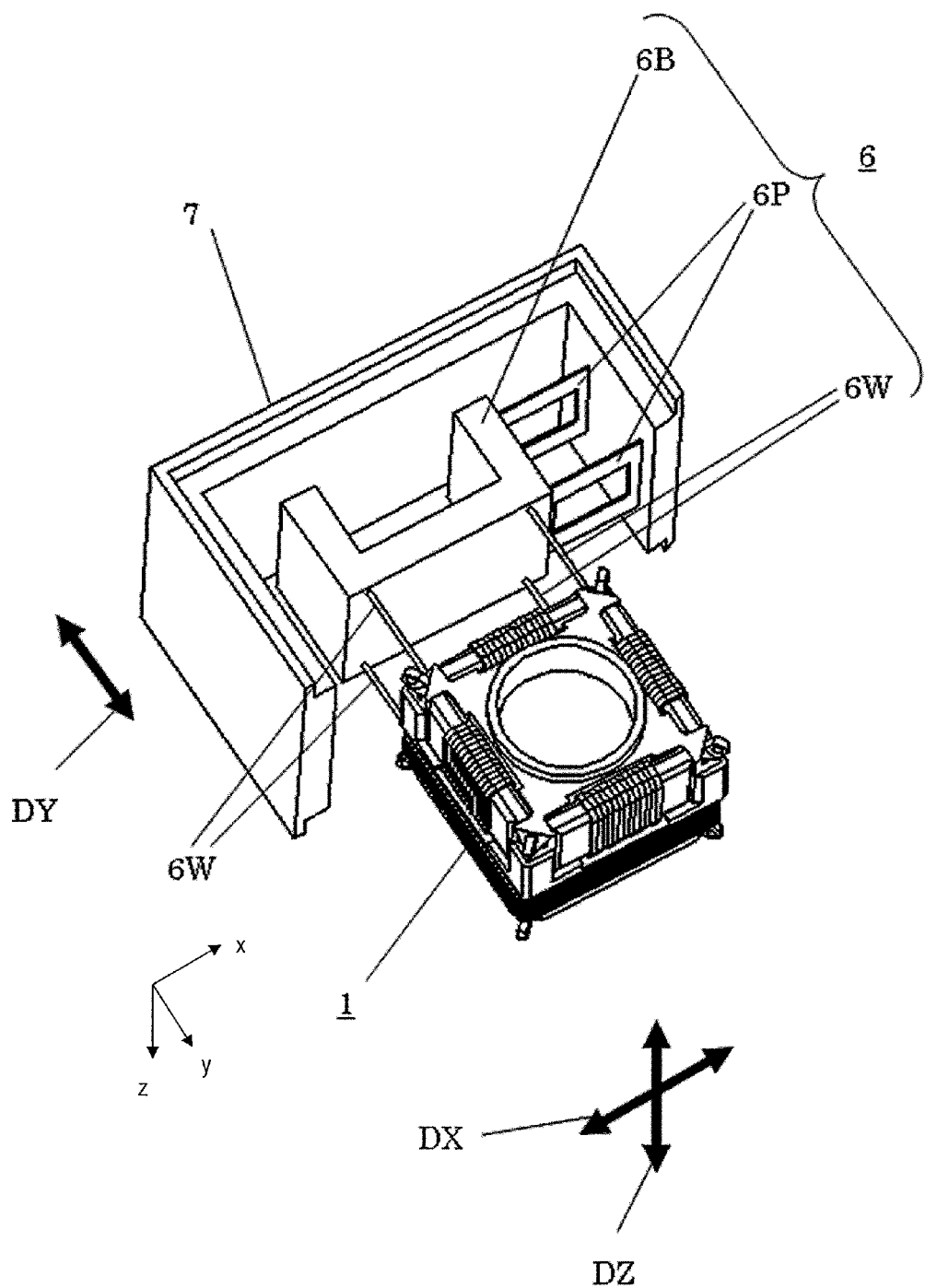
FIG. 9 is a perspective view showing the relationship between the movable lens unit, the support unit, and the body base of the imaging device shown in FIG. 1.

The movable lens unit 1 is supported on the body base 7 via the support unit 6. As shown in FIG. 8 and FIG. 9, in the present embodiment, the support unit 6 includes four wires 6W, two plate springs 6P, and a support holder 6B.

The movable lens holder 1B of the movable lens unit 1 is supported on the support holder 6B via the four wires 6W. The four wires 6W are placed in parallel to one another. Moreover, the support holder 6B is supported on the body base 7 via the two plate springs 6P. The two plate springs 6P are also placed in parallel to one another.

The wires 6W are disposed in parallel to the second direction (y axis). Therefore, as the wires 6W flex, the movable lens unit 1 can move only along the first and second directions (x axis, y axis), i.e., the arrow DX direction and the arrow DZ direction, in the xz plane. Since the wires 6W hardly expand or contract, the movable lens unit 1 is restrained from moving along the arrow DY direction (second direction (y axis)) relative to the support holder 6B.

On the other hand, the plate springs 6P are parallel to the xz plane. Therefore, as the plate springs 6P flex, the movable lens unit 1 can move only along the second direction (y direction), i.e., the arrow DY direction. Since the plate springs 6P also hardly expand or contract, the support holder 6B is restrained from moving along the DX direction and the DY direction (first and third directions (x, y axis)), which are parallel directions to the plate springs 6P.

As a result, the movable lens unit 1 is restrained from making any displacement in a manner of rotating around an axis which is parallel to each of the first, second, and third directions (y axis).

Figure 10:
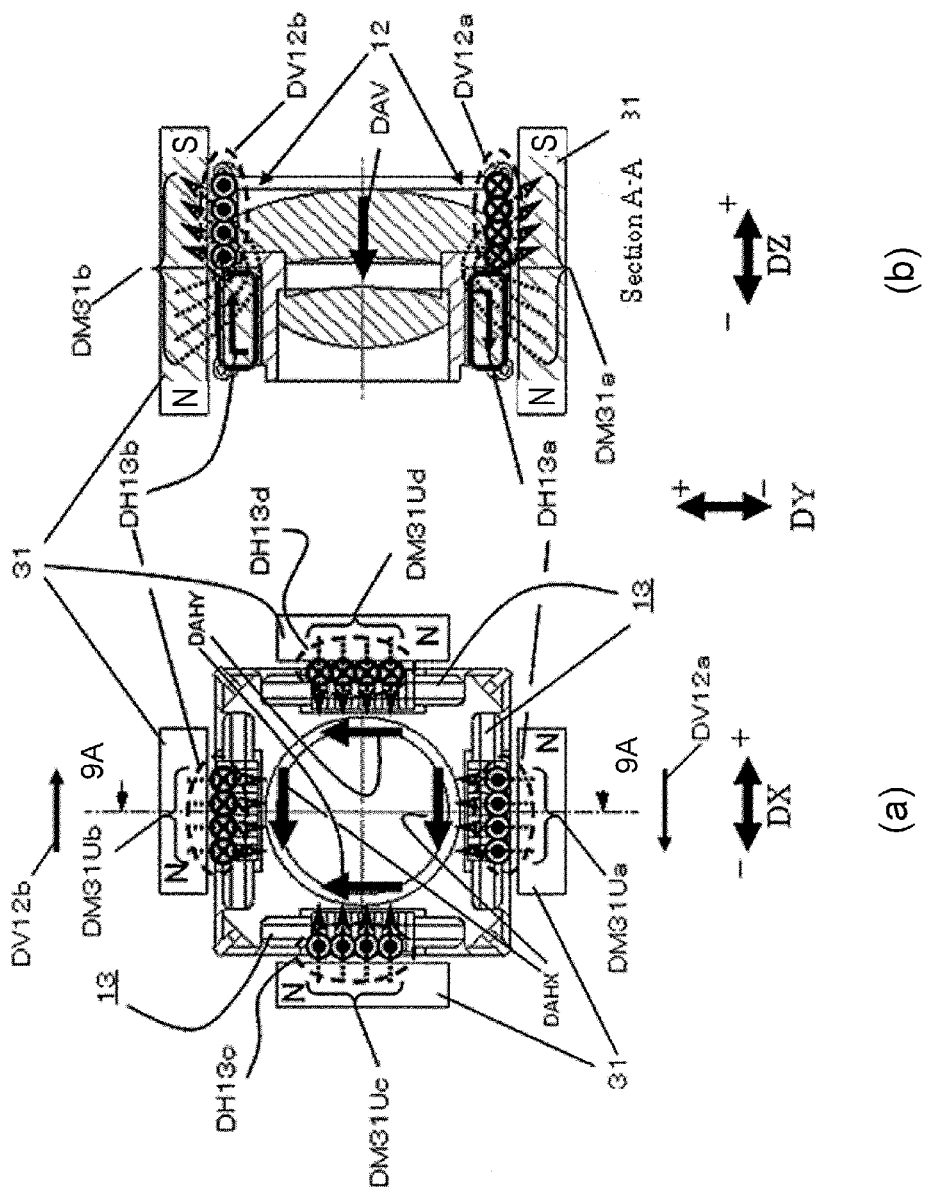
FIGS. 10(a) and 10(b) are a plan view and a cross-sectional view showing the principles of an actuator for driving the movable lens unit according to an embodiment of the present invention.

Next, driving of the movable lens unit 1 by the driving mechanism will be described. FIG. 10(a) is a diagram showing the movable lens unit 1 as viewed from the subject side; and FIG. 10(b) is a cross-sectional view along a center line 9A-9A in FIG. 10(a), where the upper left side in the figure corresponds to the subject side.

As shown in FIGS. 10(a) and (b), a current flows through the optical axis direction driving coil 12 provided on the movable lens unit 1, in directions indicated as an arrow DV12a direction and an arrow DV12b direction (i.e., clockwise in FIG. 10(a) around the entire circumference of the optical axis direction driving coil 12). Moreover, currents flow in the four orthogonal direction driving coil units 13 (orthogonal direction driving coils 13C), in an arrow DH13a direction, an arrow DH13b direction, an arrow DH13c direction, and an arrow DH13d direction. In the figure, each circle mark with a black dot in the center represents a direction from rearward of the plane of the figure to frontward of the plane of the figure; and each circle mark with an X symbol in the center represents a direction from frontward of the plane of the figure to rearward of the plane of the figure. Moreover, the magnets 31 are all placed with differing magnetic poles lying along the third direction (z axis). In the present embodiment, the N pole is placed on the subject side, and the S pole on the imager side. Therefore, the N pole opposes each orthogonal direction driving coil unit 13 (orthogonal direction driving coils 13C), whereas the S pole opposes the optical axis direction driving coil 12. The magnets 31 generate magnetic fields in the directions of an arrow DM31a, an arrow DM31b, an arrow DM31c, and an arrow DM31d. As shown in FIG. 10(b), in the neighborhood of the optical axis direction driving coil 12, the magnetic fields head from the inside to the outside of the movable lens unit 1; and in the neighborhood of the orthogonal direction driving coil units 13, the magnetic fields head from the outside to the inside of the movable lens unit 1.

When currents flow in such directions and magnetic fields are being generated, based on the principle of electromagnetic force generation, the movable lens unit 1 receives a force in the − direction along the DX direction (arrow DAHX direction), in the +direction along the DY direction (arrow DAHY direction), and in the − direction along the DZ direction (arrow DAV direction).

By determining the directions and magnitudes of the currents flowing through the respective coils based on an interrelationship conforming to the above, the movable lens unit 1 can be accordingly controlled as appropriate, thus being moved with arbitrary amounts of displacement along the first, second, and third directions. This driving force also depends on the magnitudes and directions of the magnetic flux density generated from the magnets 31 at the positions of these coils.

By using this principle, the amounts of move and moving velocities of the movable lens unit 1 along the DX direction, the DY direction, and the DZ direction can be controlled. Since the DX direction, the DY direction, and the DZ direction are orthogonal to each other, the movable lens unit 1 is able to move along these three directions independently.

Thus, the movable lens unit 1 is able to make relative moves with respect to the imager 9, along the DX direction, the DY direction, and the DZ direction. Therefore, by appropriately designing the optical characteristics of the movable first lens 1L1, the movable second lens 1L2, and the fixed first lens 8L1 and fixed second lens 8L2, focus adjustment and optical handshake correction functions can be conferred to the movable lens unit 1 as imaging optics for a camera.

Next, a method of determining the displacement of the movable lens holder 1 with the strain detectors 15 will be described.

As shown in FIG. 5, the magnitudes and directions of expansion or contraction along directions which are parallel to the center axes of the strain detectors 15 are represented by the vectors of arrow P, arrow Q, arrow R, arrow S, arrow T, arrow U, arrow V, and arrow W. The magnitude of each vector is determined from the amount of strain that is detected by the respective strain detector 15. These vectors are represented by the following vector expressions.

[math. 1]

$$\vec{P}, \vec{Q}, \vec{R}, \vec{S}, \vec{T}, \vec{U}, \vec{V}, \vec{W}$$

Moreover, a displacement vector of the movable lens holder 1 relative to the body base 7 and upper body base 5 at an arbitrary point thereon is represented by the following vector expression.

[math. 2]

$$\vec{C}$$

In this state, the displacement vector at an arbitrary point of the movable lens holder 1 can be expressed by (eq. 1) below.

[math. 3]

$$\vec{C} = \vec{P} + \vec{Q} + \vec{R} + \vec{S} + \vec{T} + \vec{U} + \vec{V} + \vec{W} \quad \text{(eq. 1)}$$

Especially in the case where the directions of displacement of the movable lens holder 1 are only the linear directions of the arrow DX direction, the arrow DY direction, or the arrow DZ direction, freedom is limited to the three directions; therefore, a displacement is uniquely determined once the positions of arbitrary four points of the movable lens holder 1 are determined. Therefore, by only using arbitrary four among the aforementioned eight vectors, a displacement vector at an arbitrary point of the movable lens holder 1 can be determined. This means that a displacement vector of the movable lens holder 1 at an arbitrary point thereon can be determined with at least four strain detectors 15.

For example, in the case where the plate springs 6P have undergone not only simple deformation along a monoaxial direction but also deformation in a twisting direction, or in the case where the wires 6W have undergone not only deformation along biaxial directions but also deformation in a twisting direction, the movable lens holder 1 additionally experiences a rotating motion. In such cases, five or more vectors may also be used for calculation.

It can be seen that, by detecting changes in the electrical resistance value r of the strain detectors 15, the imaging device of the present embodiment is able to detect amounts of displacement which are parallel to the longitudinal directions of the strain detectors 15, i.e., the magnitude of the displacement vector.

As shown in FIG. 5, it is assumed that the eight strain detectors 15 have electrical resistances $r_P$, $r_Q$, $r_R$, $r_S$, $r_T$, $r_U$, $r_V$, and $r_W$. The imaging device of the present embodiment further includes a detection system for detecting such resistance values. For example, a detection system is constructed which includes circuitry such that both ends of each strain detectors 15 are wired as appropriate in order to be incorporated into a bridge circuit or the like. By powering the respective strain detectors 15, the detection system becomes able to detect the resistance values $r_P$, $r_Q$, $r_R$, $r_S$, $r_T$, $r_U$, $r_V$, and $r_W$, and detect changes in such resistance values in accordance with a displacement of the movable lens holder 1. As a result, lengths of expansion or contraction of the respective strain detectors 15 in accordance with changes in the resistance value of the detection system are calculated.

From the determined lengths of expansion or contraction of the strain detectors 15, the magnitudes of the following vectors, or an amount of displacement of each vector from a reference position, is determined.

[math. 1]

$$\vec{P}, \vec{Q}, \vec{R}, \vec{S}, \vec{T}, \vec{U}, \vec{V}, \vec{W}$$

As mentioned earlier, a displacement vector of an arbitrary point of the movable lens holder 1 can be determined as below, whereby a position of the movable lens unit 1 relative to the body base 7 can be identified.

[math. 2]

$$\vec{C}$$

Therefore, for example, a difference between an identified position of the movable lens unit 1 and a target position of movable lens unit 1 may be determined, and based on the determined difference, feedback control may be performed for the currents to flow through the optical axis direction driving coil 12 and the orthogonal direction driving coils 13C, whereby the position of the movable lens unit 1 can be controlled. Thus, by using the single movable lens unit 1, it is possible to realize focus adjustment and optical handshake correction.

In order to suppress influences of errors occurring due to temperature variation, individual variations, and other factors, it would be effective to previously find a correlation between actual displacement of the movable lens unit 1 and electrical resistance values of the strain detectors 15, and exploit such values.

Thus, in accordance with the imaging device of the present embodiment, because a driving mechanism for moving a movable lens unit along triaxial directions is provided, it is possible to realize focus adjustment and optical handshake correction with a single driving mechanism, thus making it possible to downsize the imaging device. Moreover, by using strain detectors for detecting the position of the movable lens unit, it is possible to inexpensively detect the position of the movable lens unit with a simple construction, thus realizing focus adjustment and optical handshake correction.

Figure 11:
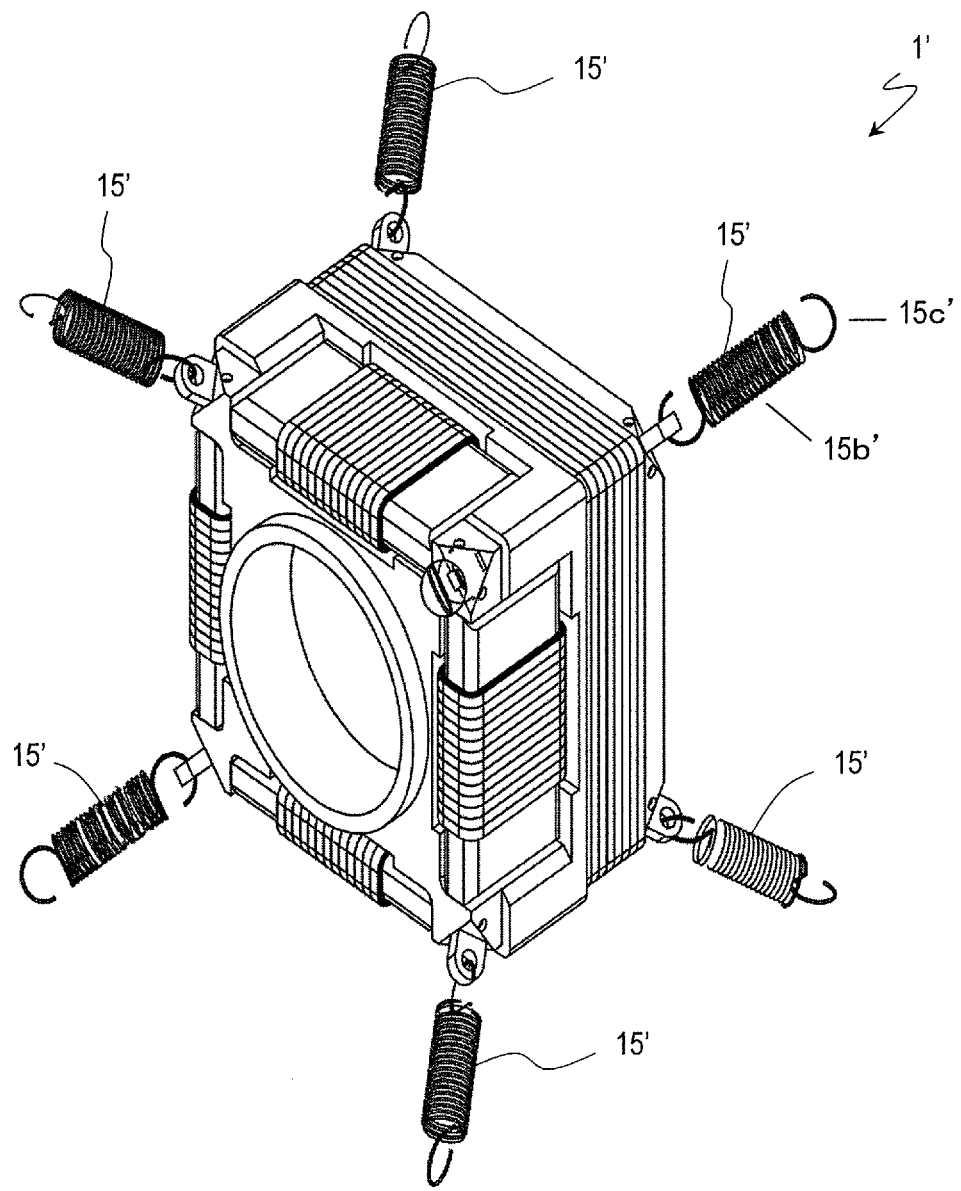
FIG. 11 is a perspective view showing another example of strain detectors of the imaging device shown in FIG. 1.

In the above embodiment, each strain detector 15 is structured so that its strain detection section is supported by a supporter, where the strain detection section detects strain caused by elastic deformation of the supporter. However, the strain detector 15 does not need to be supported by a supporter. FIG. 11 shows a main portion of an imaging device which detects displacement of the movable lens unit 1' with strain detectors 15', such that the strain detectors themselves are capable of large elastic deformation. Similarly to the above embodiment, the strain detectors 15' are respectively connected to the eight apices of the movable lens holder of the movable lens unit 1'.

As shown in FIG. 11, each strain detector 15' has a strain detection section 15b'. The strain detection section 15b' is composed of a wire of electrical conductor being formed into a coil shape. When the movable lens unit 1 is driven by the driving mechanism so as to be displaced from a neutral position, the strain detector 15' receives stress, thus expanding or contracting along the longitudinal direction A. At this time, while the coil of the strain detection section 15b' is elongated, the wire composing the coil also stretches in itself. Since the wire is formed into a coil shape, the amount of strain' which the detection section 15b receives per unit length is smaller than that of the strain detection section 15b of the strain detector 15 in the aforementioned embodiment, which is formed in a meandering pattern. As a result, the strain detector 15' is capable of large deformation, without becoming broken.

The amount of strain that is detectable by the coil-shaped strain detection section 15b' is determined as follows.

Figure 12:
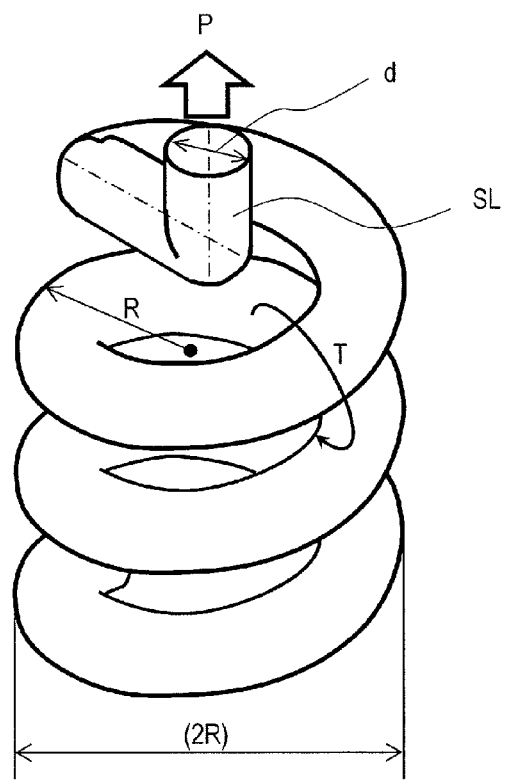
FIG. 12 is a perspective view showing enlarged a portion of a strain detection section of the strain detector shown in FIG. 11.

FIG. 12 is a perspective view showing enlarged the neighborhood of an end portion of the strain detection section 15b' of the strain detector 15'. The wire of the strain detection section 15b' has a diameter d, and possesses a coil shape with a radius R. A force P is applied in a parallel direction to the coil center axis of the strain detection section 15b', whereby a twisting moment T acting on the coil-like portion of the wire is generated. T can be expressed in terms of P, as indicated in (eq. 2).

$$T = PR \quad \text{(eq. 2)}$$

Assuming a spring modulus k when the strain detection section 15b' is regarded as a coiled spring, and a length of expansion or contraction ΔL, ΔL can be expressed by (eq. 3).

$$\Delta L = kP \quad \text{(eq. 3)}$$

From (eq. 2) and (eq. 3), T can be expressed in terms of ΔL by (eq. 4).

$$T = R\Delta L/k \quad \text{(eq. 4)}$$

Assuming a shear stress τ0 of the coil-like portion of the strain detection section 15', τ0 can be expressed by (eq. 5).

$$\tau 0 = 16T/\pi d3 \quad \text{(eq. 5)}$$

On the other hand, assuming a lateral elastic modulus of G and a shear strain of γ, the shear stress can be expressed by (eq. 6).

$$\tau = G\gamma, \text{ that is, } \gamma = \tau/G \quad \text{(eq. 6)}$$

When τ=τ0, by substituting (eq. 5) into (eq. 6), (eq. 7) is obtained.

$$\gamma = 16T/\pi d3G \quad \text{(eq. 7)}$$

Figure 13:
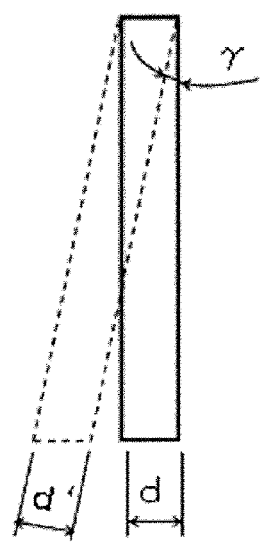
FIG. 13 is a diagram illustrating deformation of the strain detection section of the strain detector shown in FIG. 11.
Figure 14:
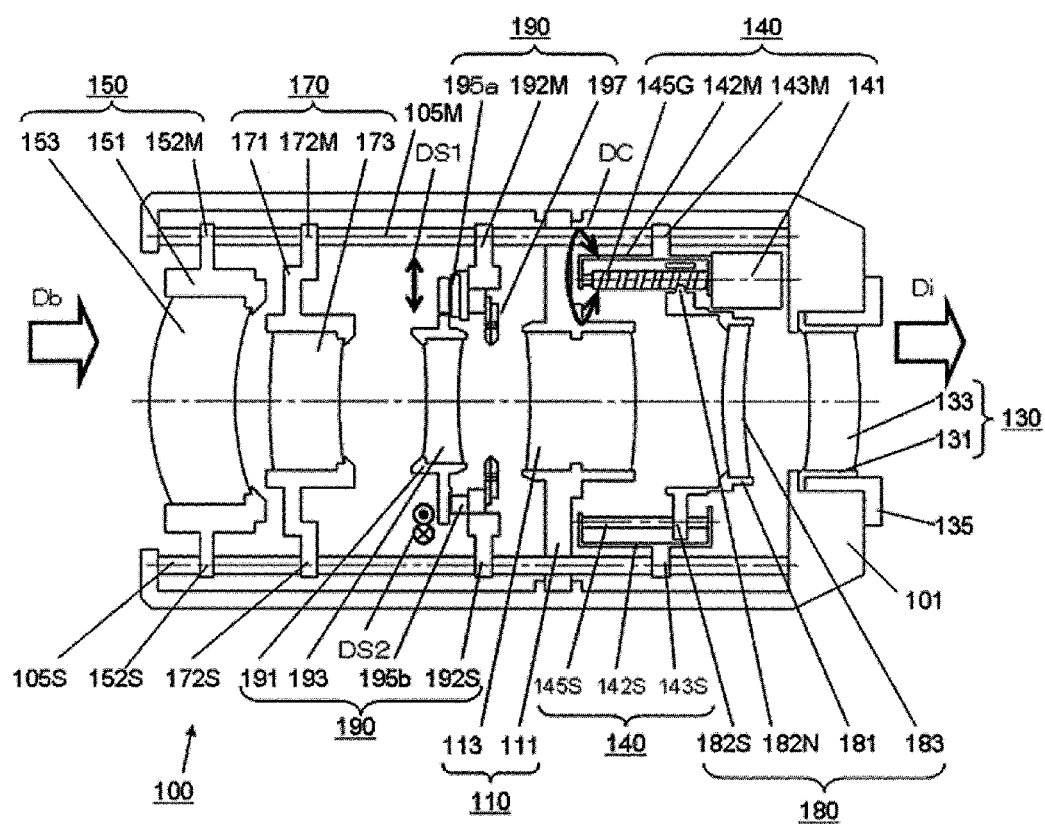
FIG. 14 is a cross-sectional view showing the construction of a lens barrel of a conventional imaging device.

FIG. 13 illustrates deformation of a minute region in the coil-like portion of the strain detection section 15b', where the wire has undergone deformation by a minute angle γ with the application of the force P in FIG. 12. Assuming that strain occurs in the wire at this time so that the diameter d changes to a post-strain diameter d', the relationship between d and d' can be expressed by (eq. 8).

$$d' = d \times \cos \gamma \quad \text{(eq. 8)}$$

On the other hand, the strain from changing from d into d', i.e., the lateral strain ε' when defining longitudinal strain as a strain along the longitudinal direction of the wire, can be expressed by (eq. 9).

$$\epsilon' = (d-d')/d \quad \text{(eq. 9)}$$

By substituting (eq. 8) into (eq. 9), (eq. 10) is obtained.

$$\epsilon' = d(1-\cos \gamma)/d = 1-\cos \gamma \quad \text{(eq. 10)}$$

Herein, assuming a Poisson ratio ν of the strain detection section 15b', the longitudinal strain ε can be expressed by (eq. 11).

$$\epsilon = \epsilon'/\nu \quad \text{(eq. 11)}$$

By substituting (eq. 10) into (eq. 11), (eq. 12) is obtained.

$$\epsilon = (1-\cos \gamma)/\nu \quad \text{(eq. 12)}$$

By substituting (eq. 7) into (eq. 12), (eq. 13) is obtained.

$$\epsilon = (1/\nu)\{1-\cos(16T/\pi d3G)\} \quad \text{(eq. 13)}$$

Now, assuming an electrical resistance r of the strain detection section 15b' prior to the deformation, and also an amount of decrease Δr in electrical resistance after the deformation, the relationship between them can be expressed by (eq. 14).

$$\Delta r/r = K\epsilon \quad \text{(eq. 14)}$$

In (eq. 14), K is strain sensitivity, which is a value that is specific to the material of the strain member. For example, a material whose main components are nickel, chromium, and the like has a value of about 2.0.

By substituting (eq. 13) into (eq. 14), (eq. 15) is obtained.

$$\Delta r/r = (K/\nu)\{1-\cos(16T/\pi d^3 G)\} \quad \text{(eq. 15)}$$

By substituting (eq. 4) into (eq. 15), (eq. 16) is obtained.

$$\Delta r/r = (K/\nu)\{1-\cos(16R\Delta L/\pi d^3 Gk)\} \quad \text{(eq. 16)}$$

It can be seen from the above that, through deformation ΔL with the force P acting in a direction which is parallel to the coil center axis, the electrical resistance r of the strain detection section 15b' changes so that the electrical resistance value r has a rate of change which is expressed by (eq. 16). (eq. 16) is transformed into (eq. 17).

$$\Delta L = (\pi d^3 Gk/16R)\cos^{-1}\{1-(\Delta r/r)(\nu/K)\} \quad \text{(eq. 17)}$$

That is, by detecting a change in the electrical resistance value r, displacement in a direction which is parallel to the coil center axis of the strain detection section 15b' can be detected. The method of determining the position of the movable lens unit 1 from the resistance of each strain detector 15' is as described above.

By using strain detectors of the above form, it becomes unnecessary to provide a strain detection section on a supporter, so that an accurate strain can be detected with a simpler construction.

Thus, an embodiment of the imaging device has been described with reference to the figures. However, the present invention is not limited to the above embodiment, but admits various modifications.

First, although not shown for fear of complicating the figures, in the above embodiment, connection lines for powering are respectively connected to the optical axis direction driving coil 12, the orthogonal direction driving coils 13C, and the strain detectors 15. Moreover, a control device which controls the currents to be flown through these coils in order to drive the movable lens unit 1 is connected to the imaging device. Similarly, although not shown for fear of complicating the figures, connection lines are connected also to the strain detectors. In this case, by forming the movable lens holder 1B from a metal or the like, or forming at least eight lens holder hooks 1BF from a metal, and electrically connecting them, one of the connection lines to be connected to each strain detector can be shared.

In the above embodiment, a voice coil actuator is used in order to drive the movable lens unit in each direction. However, the magnets may be disposed at positions other than those described in the above embodiment, so long as especially such magnetic fields as are shown in FIGS. 10(a) and (b) are generated. Similarly, the shapes and positions of the coils provided on the movable lens unit are not limited to those in the above embodiment. Furthermore, an actuator of any other construction capable of similar driving may be employed, instead of a voice coil actuator. In this case, the actuator may be provided on either one of the movable lens unit or the body base, or on both of them. Moreover, in the case where a voice coil actuator is used, the magnets may be provided on the movable lens unit, while the coils may be provided on the body base.

Moreover, the strain detectors may be of a different construction from the construction described in the above embodiment. For example, in the case where the strain detection section is made into a coil shape without providing a supporter, a linear portion that is connected to the coil-shaped portion may be provided. In this case, since little strain occurs in the coil-like portion, a change in resistance due to strain in the linear portion may be detected.

In the case where the strain detector lacks a supporter, the strain detection section may be composed of a linear wire, and a coil-shaped elastic member may be connected as shown in FIG. 6(b).

In the above embodiment, the support unit includes two plate springs and four wires. However, so long as a similar freedom is achieved, the support unit may support the movable lens unit via other structures. For example, a support unit may used which includes: a first movable section supported by the body base 7 so as to be capable of moving relative to the body base 7 along a first direction; a second movable section supported by the first movable section so as to be capable of moving relative to the first movable section along a second direction which is orthogonal to the first direction; and a third movable section supported by the second movable section so as to be capable of moving relative to the second movable section along a third direction which is orthogonal to the first and second directions. In this case, the third movable section and the movable lens unit 1 may be made integral.

Moreover, the imaging device does not need to have a support unit of plate springs and wire. In that case, as described above, a coil-like portion may be formed in a portion of each strain detector, or a coil-shaped elastic member may be connected in series to each strain detector. Since the coil-like portion or elastic member has good spring property, the movable lens unit can be appropriately supported. In this case, other than the arrow DX direction, the arrow DY direction, and the arrow DZ direction, the movable lens unit 1 is capable of rotating around axes which are parallel to the arrow DX direction, the arrow DY direction, and the arrow DZ direction, whereby freedom in rotating directions is also obtained.

In this case, since the movable lens unit 1 has an increased freedom relative to the body base 7, the actuator for driving the same may also have additional driving directions, thereby achieving alignment and attitude control with a higher precision. For example, by independently controlling all of the current directions when powering the orthogonal direction driving coils 13C, and so on, the movable lens unit 1 is allowed to be driven in other directions in addition to the linear directions of the arrow DX direction, the arrow DY direction, and the arrow DZ direction.

Moreover, the optics that are incorporated in the movable lens unit 1 and the fixed lens unit 8, which are described in the above embodiment, are examples. An imaging device that is capable of providing the effects described in the above embodiment can also be realized by using various other optics depending on the application.

In the above embodiment, displacement of the movable lens unit is detected by eight strain detectors. However, as described above, in the case where the movable lens unit only undergoes linear displacement with 3 degrees of freedom of the arrow DX direction, the arrow DY direction, and the arrow DZ direction, an amount of displacement of the movable lens unit can be determined with just four strain detectors. Therefore, by disposing the four strain detectors while giving consideration to load balance or the like, it is possible to realize an imaging device that can appropriately control driving of the movable lens unit. For example, the four strain detectors may be provided between the movable lens unit and the body base so that they are connected to the movable lens unit at the apices of a regular tetrahedron.

INDUSTRIAL APPLICABILITY

The imaging device disclosed herein is suitably used for various imaging devices or appliances having an internal imaging device, e.g., digital still cameras, digital camcorders, or monitoring cameras, and is particularly suitably used in small or thin imaging devices or appliances in which such an imaging device is internalized.

REFERENCE SIGNS LIST 1 movable lens unit
1L1 movable first lens
1L2 movable second lens
1B movable lens holder
1BF lens holder hook
1BD coil bobbin receptacle
1BG coil base portion
12 optical axis direction driving coil
13 orthogonal direction driving coil unit
13B coil bobbin
13C orthogonal direction driving coil
15 strain member
3 magnet unit
31 magnet
33 lower body base
33D magnet receptacle
33F yoke base hook
33P alignment bump
5 upper body base
5F upper body base hook
5H upper body base alignment hole
6 support unit
6B support holder
6P plate spring
6W wire
7 body base
8 fixed lens unit
8B fixed lens holder
8L1 fixed first lens
8L2 fixed second lens
9 imager
d wire diameter of extension coil spring-type strain gauge
R coil outer size (radius) of extension coil spring-type strain gauge
P tension on extension coil spring-type strain gauge
T twisting moment acting on wire material due to tension on extension coil spring-type strain gauge
100 lens barrel
101 barrel body
105M zoom main-axis
105S zoom sub-axis
110 central fixed lens unit
111 central fixed lens
113 central fixed lens holder
130 imaging-side fixed lens unit
131 imaging-side fixed lens holder
133 imaging-side fixed lens
135 imaging-side fixed lens unit retainer
140 focus adjustment unit
141 focus motor
142M focus adjustment unit main-frame
142S focus adjustment unit sub-frame
143M focus adjustment unit main-axis receiver
143S focus adjustment unit sub-axis receiver
145G focus adjustment lens driving screw
145S focus adjustment lens guide
150 first zoom lens unit
151 first zoom lens holder
152M first zoom main-axis receiver
152S first zoom sub-axis receiver
153 first zoom lens
170 second zoom lens unit
171 second zoom lens holder
172M second zoom main-axis receiver
172S second zoom sub-axis receiver
173 second zoom lens
180 focus adjustment lens unit
181 focus adjustment lens holder
182N focus adjustment lens nut
182S focus adjustment lens sub-axis receiver 183 focus adjustment lens
190 optical handshake correction lens unit
191 optical handshake correction lens holder
192M optical handshake correction main-axis receiver
192S optical handshake correction sub-axis receiver
193 optical handshake correction lens
195a correction first actuator
195b correction second actuator
197 iris unit
200 optical element adjustment device
201 optical element
202 intermediate block
203 retaining means
204 driving means
205 elastic hinge
206 stationary block

The invention claimed is:

1. An imaging device comprising:
a movable lens unit including at least one lens for converging light from a subject and a lens holder supporting the at least one lens;
a body base supporting the movable lens unit so as to be capable of moving along a first direction and a second direction which are orthogonal to each other on a plane perpendicular to an optical axis of the at least one lens and along a third direction which is parallel to the optical axis of the at least one lens;
an imager being supported by the body base for converting light transmitted through the movable lens unit to an electrical signal;
a driving mechanism being provided on the movable unit and/or the body base for driving the movable lens unit along the first, second, and third directions; and
a plurality of strain detectors provided between the movable unit and the body base; and
an elastic member provided at one end of each of the plurality of strain detectors, each strain detector and the corresponding elastic member being connected in series and provided between the movable unit and the body base.

2. The imaging device of claim 1, wherein each of the plurality of strain detectors has a supporter made of an elastic and a strain detection section made of an electrical conductor disposed on the supporter.

3. The imaging device of claim 1, wherein each of the plurality of strain detectors is made of an electrical conductor, and includes a coil-shaped strain detection section.

4. The imaging device of claim 1, wherein each strain detector includes a strain detection section made of an electrical conductor.

5. The imaging device of claim 1, comprising at least four said strain detectors.

6. The imaging device of claim 1, comprising eight said strain detectors.

7. The imaging device of claim 1, wherein the plurality of strain detectors have identical electrical characteristics to one another.

8. The imaging device of claims 1, further comprising at least one lens supported by the body base.

9. The imaging device of claim 1, further comprising a support unit provided between the body base and the movable lens unit so as to be capable of moving relative to the body base along a first direction and a second direction which are orthogonal to each other on a plane perpendicular to an optical axis of the at least one lens and along a third direction which is parallel to the optical axis of the at least one lens.

10. The imaging device of claim 1, wherein
the driving mechanism includes:
a first coil supported on the lens holder and wound around a direction parallel to the first direction;
a second coil supported on the lens holder and wound around a direction parallel to the second direction;
a third coil supported on the lens holder and wound around a direction parallel to the third direction;
a first magnet supported on the body base and disposed so that respectively different magnetic poles oppose the first coil and the third coil; and
a second magnet supported on the body base and disposed so that respectively different magnetic poles oppose the second coil and the third coil.

11. The imaging device of claim 2, wherein the strain detection section has a meandering pattern on a surface of the supporter.

12. The imaging device of claim 2, wherein the electrical conductor includes at least one selected from the group consisting of platinum, iron, nickel, chromium, tungsten, aluminum, gold, copper, and silver.

13. The imaging device of claim 9, wherein,
the support unit includes a support holder, four wires, and two plate springs;
the lens holder is supported on the support holder via the four wires; and
the support holder is supported on the body base via the two plate springs.

14. The imaging device of claim 10, wherein the driving mechanism includes two of at least one of the first coil and the second coil, the two sandwiching the optical axis of the at least one lens in the lens holder.

15. The imaging device of claim 10, wherein the first coil and the second coil have identical electromagnetic characteristics.

16. The imaging device of claim 3, wherein the coil-shaped strain detection section detects a displacement along a direction which is parallel to a center axis of the coil of the strain detection section according to the equation:

$\Delta L = (\pi d^3 G k / 16R) \cos^{-1}\{1 - (\Delta r/r)(v/K)\}$, where d is a diameter of a wire composing the coil;
R is a radius of the coil;
k is a spring modulus;
$\Delta L$ is a length of expansion or contraction;
v is a Poisson ratio;
K is a strain sensitivity which is a value specific to the electrical conductor;
r is an electrical resistance of the strain detection section before a deformation; and
$\Delta r$ is an amount of decrease in electrical resistance after the deformation.

* * * * *